(12) United States Patent
Renyer

(10) Patent No.: US 10,225,974 B2
(45) Date of Patent: Mar. 12, 2019

(54) BATCH SEED COATER WITH LIFT ASSEMBLY

(71) Applicant: USC, LLC, Sabetha, KS (US)

(72) Inventor: Gregory A. Renyer, Sabetha, KS (US)

(73) Assignee: USC, LLC, Sabetha, KS (US)

( * ) Notice: Subject to any disclaimer, the term of this patent is extended or adjusted under 35 U.S.C. 154(b) by 351 days.

(21) Appl. No.: 15/233,289

(22) Filed: Aug. 10, 2016

(65) Prior Publication Data

US 2018/0042169 A1 Feb. 15, 2018

(51) Int. Cl.
*A01C 1/06* (2006.01)

(52) U.S. Cl.
CPC ...................... *A01C 1/06* (2013.01)

(58) Field of Classification Search
CPC ........................................ A01C 1/06
USPC ........................................ 427/212
See application file for complete search history.

(56) References Cited

U.S. PATENT DOCUMENTS 6,648,969 B2 * 11/2003 Hirono ..................... B01J 2/006
   118/303
2011/0104369 A1   5/2011 Kim et al.
2011/0163133 A1   7/2011 Moretto
2013/0273236 A1 * 10/2013 Reineccius ............. A01C 1/06
   427/4
2015/0334911 A1  11/2015 Renyer et al.

FOREIGN PATENT DOCUMENTS

JP          2001333609         12/2001

OTHER PUBLICATIONS

International Search Report and Written Opinion dated Nov. 8, 2017, in PCT/US2017/044311.

* cited by examiner

*Primary Examiner* — Tabatha L Penny
(74) *Attorney, Agent, or Firm* — Hovey Williams LLP

(57) ABSTRACT

A batch coater assembly (20) includes an upright coater container (24) with a container-supporting lift frame assembly (26). In use, particulate materials such as seed are introduced into the container (24) and coated therein. After coating, the assembly (26) is employed to lift the container (24) to a position permitting placement of a bin (22) beneath the container (24), so that coated particulates can be directly transferred from the container (24) to the bin (22). This permits rapid batch coating of particulates from the bin (22), with refilling of the bin (22) after the coating operation. An optional dust hood assembly (28) can be employed during delivery of coated particulates to the bin (22), in order to capture dust incident to the particulate delivery.

7 Claims, 9 Drawing Sheets

BATCH SEED COATER WITH LIFT ASSEMBLY

BACKGROUND OF THE INVENTION

Field of the Invention

The present invention is broadly concerned with batch coater assemblies useful for coating particulates such as seeds or the like. More particularly, the invention is concerned with such batch coater assemblies which are equipped with lift structure allowing a coater container to be moved between a lower particulate coating position and an upper position, allowing delivery of coated particulates by gravitation from the coater container. The assemblies of the invention are particularly adapted for use with large bins having an upper inlet and a lower outlet. The particulates from a given bin are delivered into the interior of the coater container for treatment therein. Once the particulates are coated, the entire coater container can be elevated to a position allowing the original bin to be located beneath the container. This allows delivery of the coated particulates back into the original bin, thereby eliminating conventional conveyors or other transfer apparatus typically used with batch coaters.

Description of the Prior Art

Agricultural seeds are often coated prior to planting thereof. In some instances, the coatings may be formed of initially liquid synthetic resin materials having beneficial seed ingredients incorporated into the materials. In other cases, previously coated or uncoated seeds may be treated with dry materials such as talcum powder in order to prevent seed agglomeration and facilitate planting thereof.

Broadly speaking, seed coating equipment can be of the continuous variety where incoming seeds are continuously coated and delivered to output structure, or alternately of the batch variety where individual batches of seed are separately coated. Each such class of seed coating equipment has its own virtues and drawbacks. Continuous coaters are more efficient, but can cost more, particularly in conjunction with the necessary upstream and downstream seed handling equipment. Batch coaters are thus generally less expensive to purchase, operate, and maintain, and are often preferred for smaller-scale coating operations.

Batch coating equipment, while less complicated than continuous coaters, still have problems. For example, a batch coater is normally filled with incoming seed by elevating a seed bin using a lift truck or the like to a point above the batch coater inlet. Seed from the bin is then allowed to gravitate into the batch coater for treatment. However, after treatment, there are problems associated with how the coated seeds are to be handled downstream of the coater. Typically, an outlet is provided adjacent the lower end of the batch coater container, which can be opened. However, owing to the stationary nature of the batch coater, there is no easy way to handle the coated seed, especially if it is desired to refill the original seed bin. Heretofore, conveyor arrangements have been provided which extend below the coater outlet and thence upwardly for bin filling or the like. However, the necessity of providing a conveyor assembly detracts from the cost and operational advantages inherent in the use of batch coaters.

In addition, as coated seeds are delivered from batch coaters, considerably dust can be generated, especially if the seeds are coated with dry materials. Such dust can be an environmental hazard, and adversely affect coater operating personnel.

Accordingly, there is a need in the art for improved batch coating assemblies which overcome the problems encountered with conventional batch coaters.

SUMMARY OF THE INVENTION

The present invention overcomes the problems outlined above and provides an improved batch coater assembly for particulates such as seeds. Generally speaking, the assemblies include an upright coater container including a particulate inlet and a particulate outlet, together with an elongated, upright, axially rotatable auger within the coater container; and a support and lift frame assembly for the coater container, including structure operable to selectively elevate the coater container to a height sufficient to allow a particulate bin to be located below the coater container and outlet, so that coated particulate from the coater container may be deposited in the particulate bin.

In preferred forms, the coater container has a stationary, generally frustoconical base section, and an upwardly extending tubular section above the base section and releasably connected to the base section. The particulate inlet comprises a frustoconical segment operably coupled with the container for delivery of particulates to the interior of the container, the frustoconical segment having an upper end of a diameter sufficient to receive particulate from the bottom of the particulate bin. Also, the coater outlet may be equipped with an optional dust hood sized to mate with container outlet and the particulate bin, and has a vacuum conduit coupled with the dust hood in order to capture dust during deposition of the coated particulates into the bin.

In certain embodiments, the support and lift frame includes a plurality of upright, stationary support posts, with a vertically shiftable lift post telescoped over each of the support posts and vertically movable relative to the corresponding support posts. Frame structure is secured to the lift posts and the coater container so that upward and downward movement of the lift posts serves to lift and lower the container. A lift assembly is operably coupled with the lift posts to effect the upward and downward movement thereof, preferably in the form of respective hydraulic piston and cylinder assemblies. An air agitation/seal assembly is operably coupled with the coater container for injection of pressurized air into the container during coating of the particulates.

Another optional feature of the invention is the provision of a maintenance frame allowing selective elevation of the coater container in order to permit access to the internal auger and other container structure. In this way, the internal components of the container can be readily serviced.

The invention also provides a method of batch coating particulates located within a particulate bin. The method involves first elevating the loaded particulate bin above a particulate coating container having an upper inlet and a lower outlet, followed by delivery of the particulate content of the particulate bin into a lower coater container. The so-delivered particulates are then coated within the container. Thereupon, the coating container is elevated to an unloading position, and an empty particulate bin is placed below the container outlet so that the coated particulates are delivered back into a bin. Preferably, the original bin containing the uncoated particulates is used to receive the coated particulates from the elevated coating container.

DETAILED DESCRIPTION OF THE PREFERRED EMBODIMENT(S)

Figure 1:
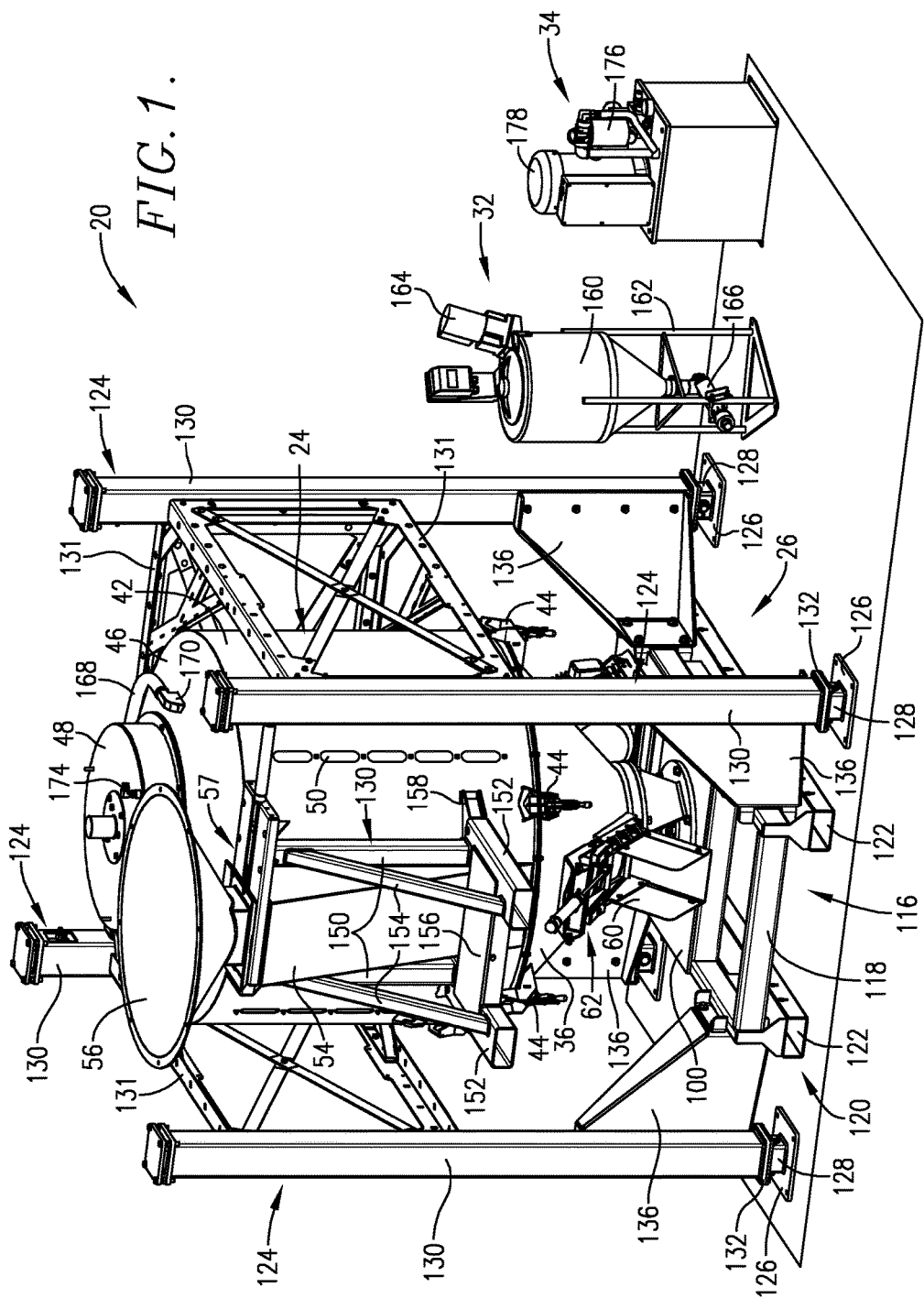
FIG. 1 is a perspective view of the batch coater of the invention, shown in conjunction with a treatment additive container, hydraulic power unit, and an optional maintenance lift frame, but without the use of a dust hood assembly.
Figure 6:
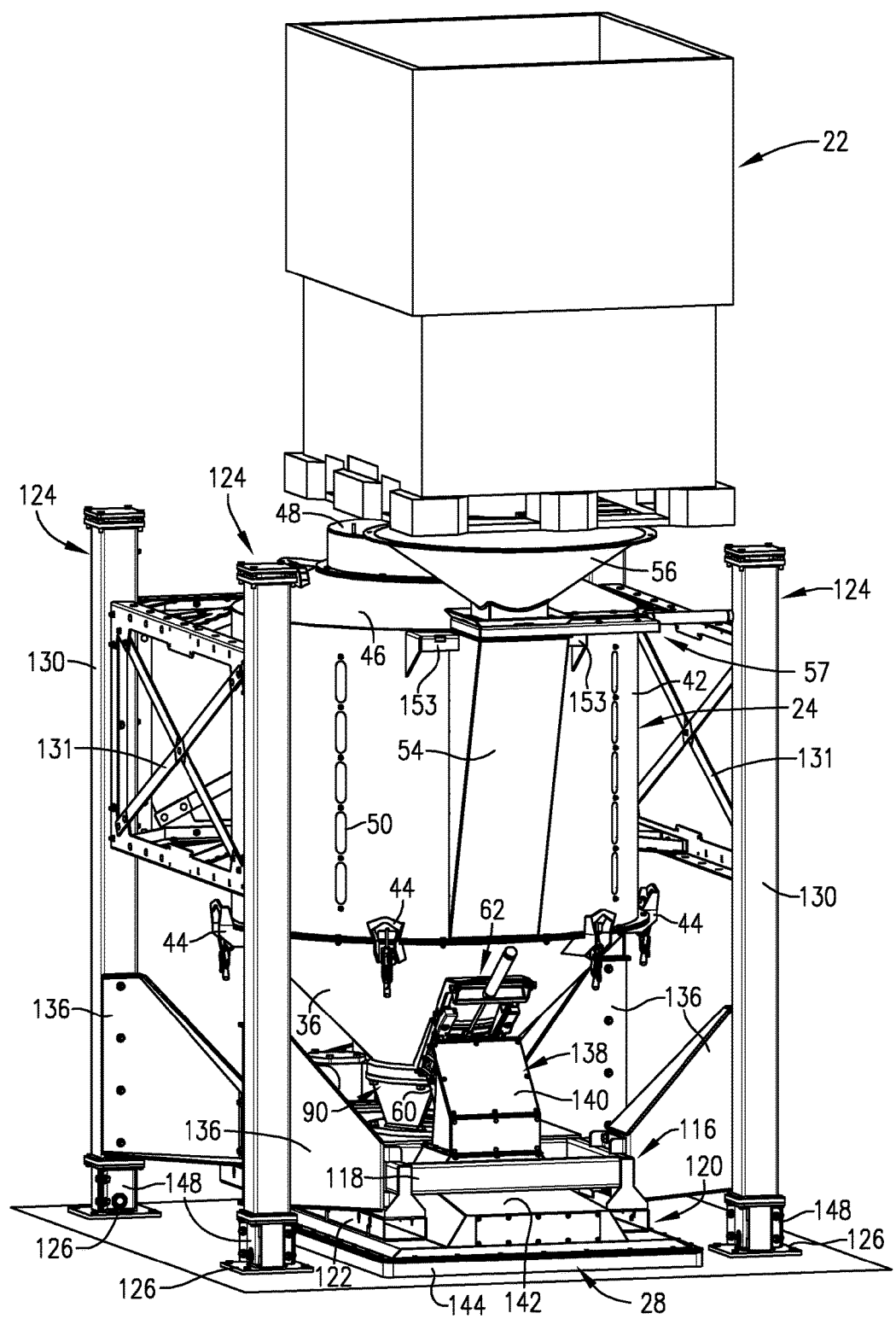
FIG. 6 is a perspective view of the batch coater of the invention, shown during loading of seed into the coater from a seed bin.
Figure 7:
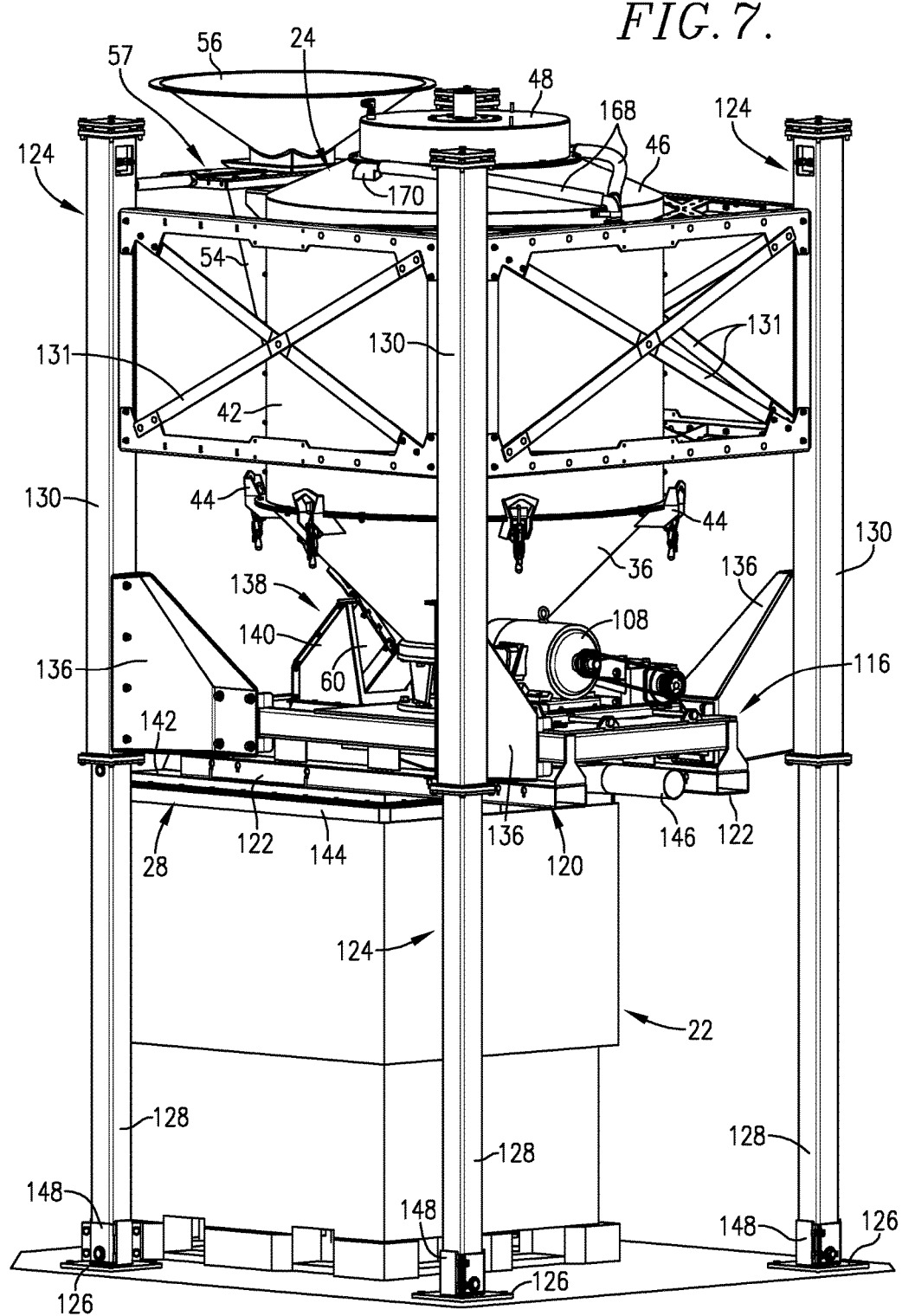
FIG. 7 is a perspective view from the opposite side illustrated in FIG. 6, and showing the seed coater in its elevated position for delivery of coated seed into the seed bin, and making use of the dust hood assembly.
Figure 8:
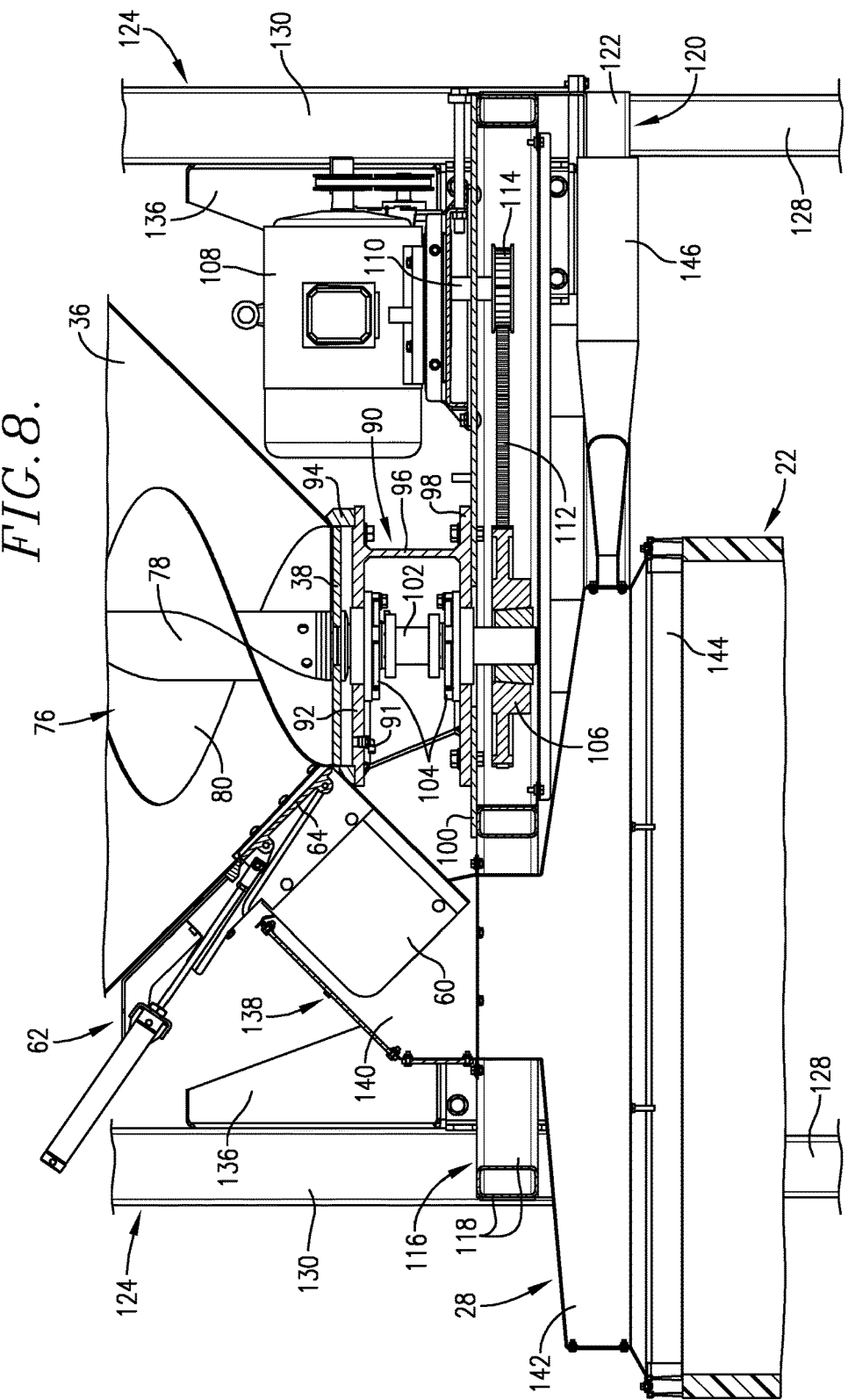
FIG. 8 is a fragmentary vertical sectional view illustrating the bottom of the seed coater and the associated dust hood assembly.

Turning to the drawings, FIG. 1 depicts a batch coater assembly 20 designed to coat individual loads or batches of particulates, such as a batch of agricultural seed contained within a portable bin 22 (FIGS. 6-7). Broadly speaking, the assembly 20 includes an upright, two-piece coater container 24, a container support and lift assembly 26, a dust hood assembly 28 (FIGS. 7-8), and an optional, detachable maintenance frame assembly 30. As illustrated in FIG. 1, the coater assembly 20 is typically used in conjunction with a coating container 32 and a hydraulic power unit 34.

Figure 4:
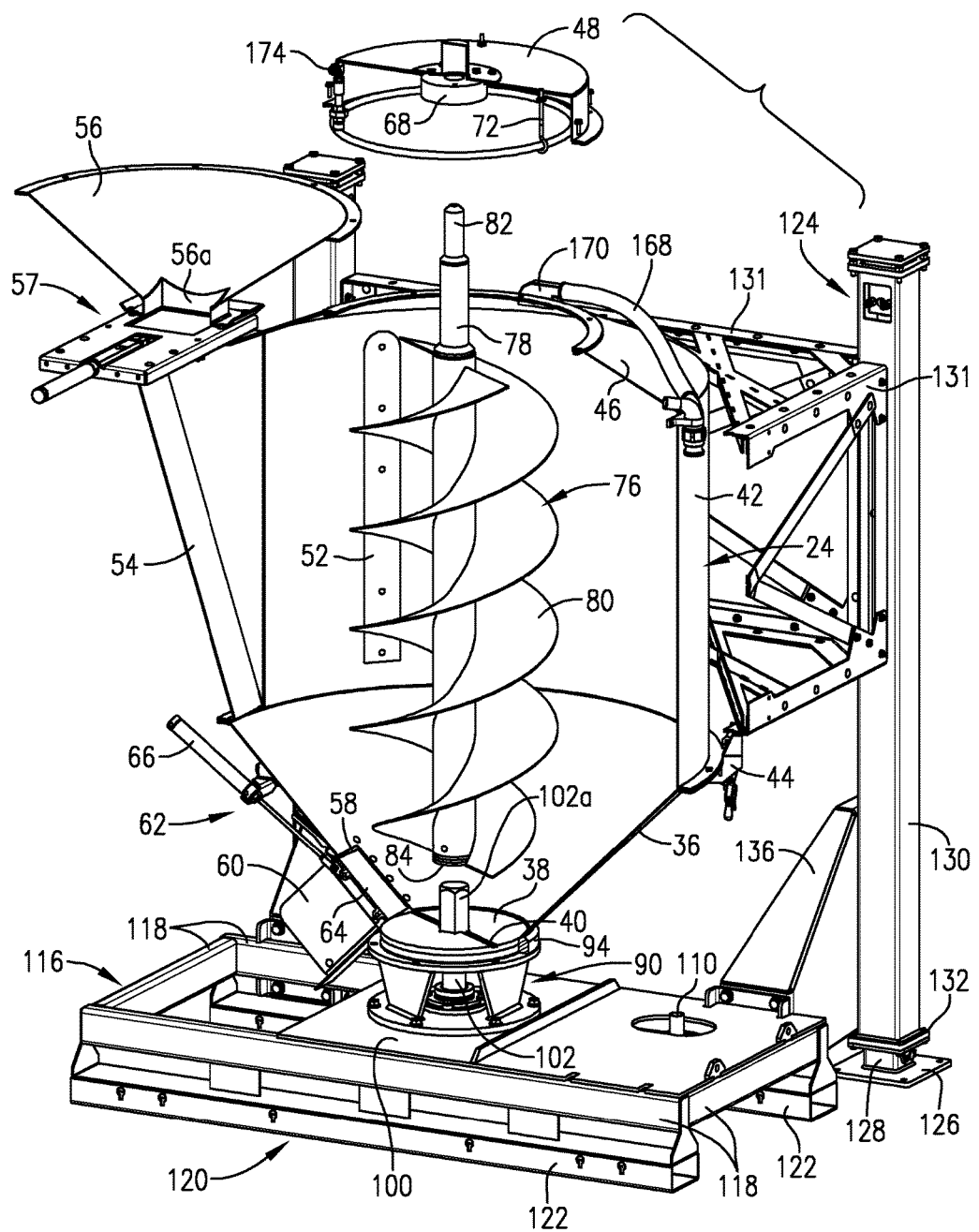
FIG. 4 is a fragmentary exploded perspective view illustrating the internal components of the batch coater and related structure.
Figure 5:
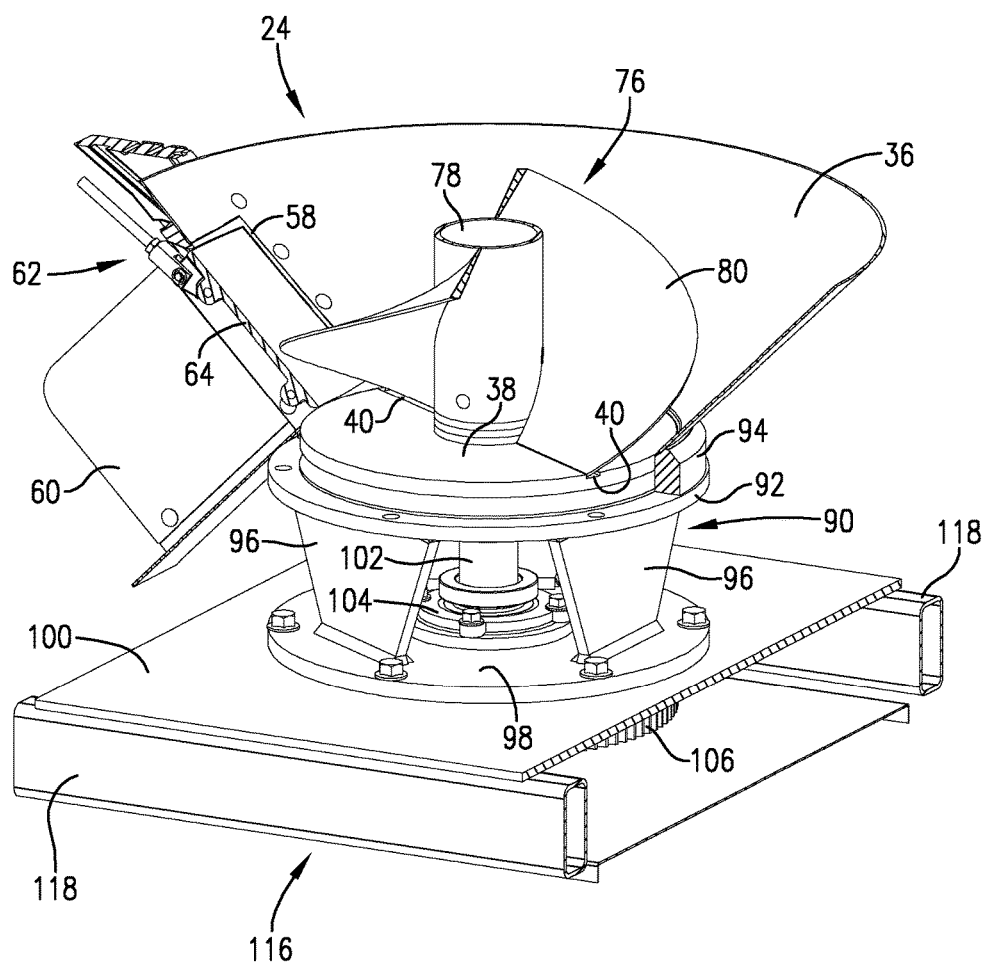
FIG. 5 is a fragmentary perspective view depicting the lower end of the coater and auger.

The coating container 24 includes a lowermost, stationary, open-top frustoconical section 36 having a lower, centrally apertured, rotatable bottom closure disk 38 equipped with a pair of radial grooves 40; a small clearance is provided between the outer periphery of disk 38 and section 36, which is important for purposes to be described. The container 24 also has an upright, tubular upper section 42, which surmounts section 36 and is releasably secured to the latter by means of a plurality of clamps 44. A conical lid 46 is positioned over the upper end of section 42 and has a central, upwardly extending top cap 48. The section 42 has a plurality of sight openings 50 with internal panes 52, allowing observation of the interior of container 24. An oblique particulate guide 54 extends upwardly and outwardly along the height of section 42 and communicates with the interior of container 24. The upper end of guide 54 has an open-top, frustoconical particulate inlet 56 with a through-opening 56a allowing entrance of particulates into container 24. A conventional, pneumatically operated slide gate assembly 57 is provided for the selective opening and closing of opening 56a (FIG. 4).

Figure 2:
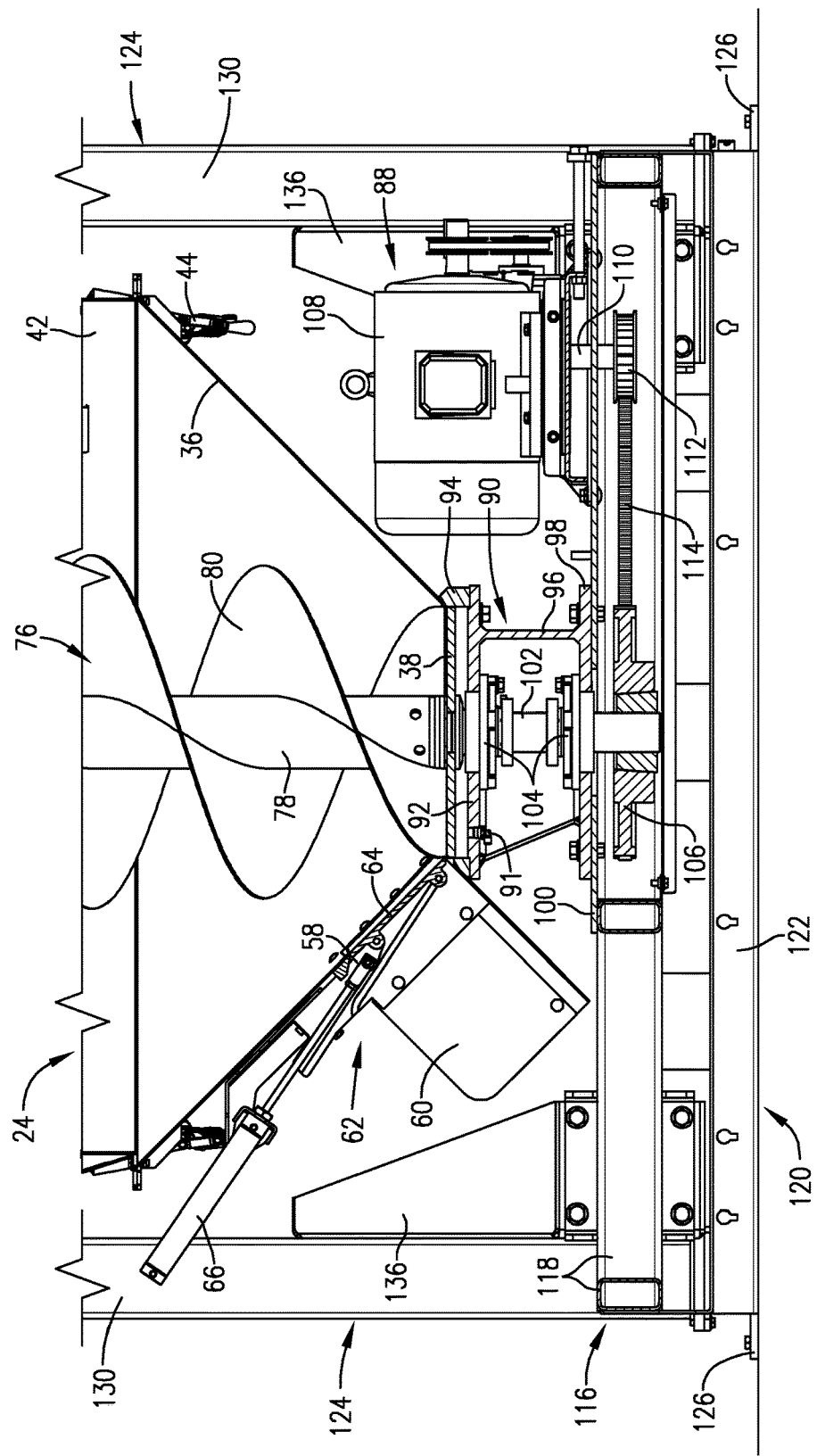
FIG. 2 is an enlarged fragmentary vertical sectional view illustrating the auger drive and air agitation assemblies for the batch coater.

As best seen in FIG. 2, the section 36 has a particulate outlet opening 58 and an associated outwardly extending delivery chute 60. The opening 58 is normally closed by means of a slide gate assembly 62 comprising a gate member 64 sized to close the opening 58, and an attached, pneumatically operated piston and cylinder assembly 66 for selective shifting of the gate member 64. Internally, the top cap 48 has a central, annular guide block 68 and a tubular liquid spray injection ring 70 supported by hangers 72. As illustrated, the top cap 48 is secured to lid 46 by means of threaded connectors 74.

Figure 3:
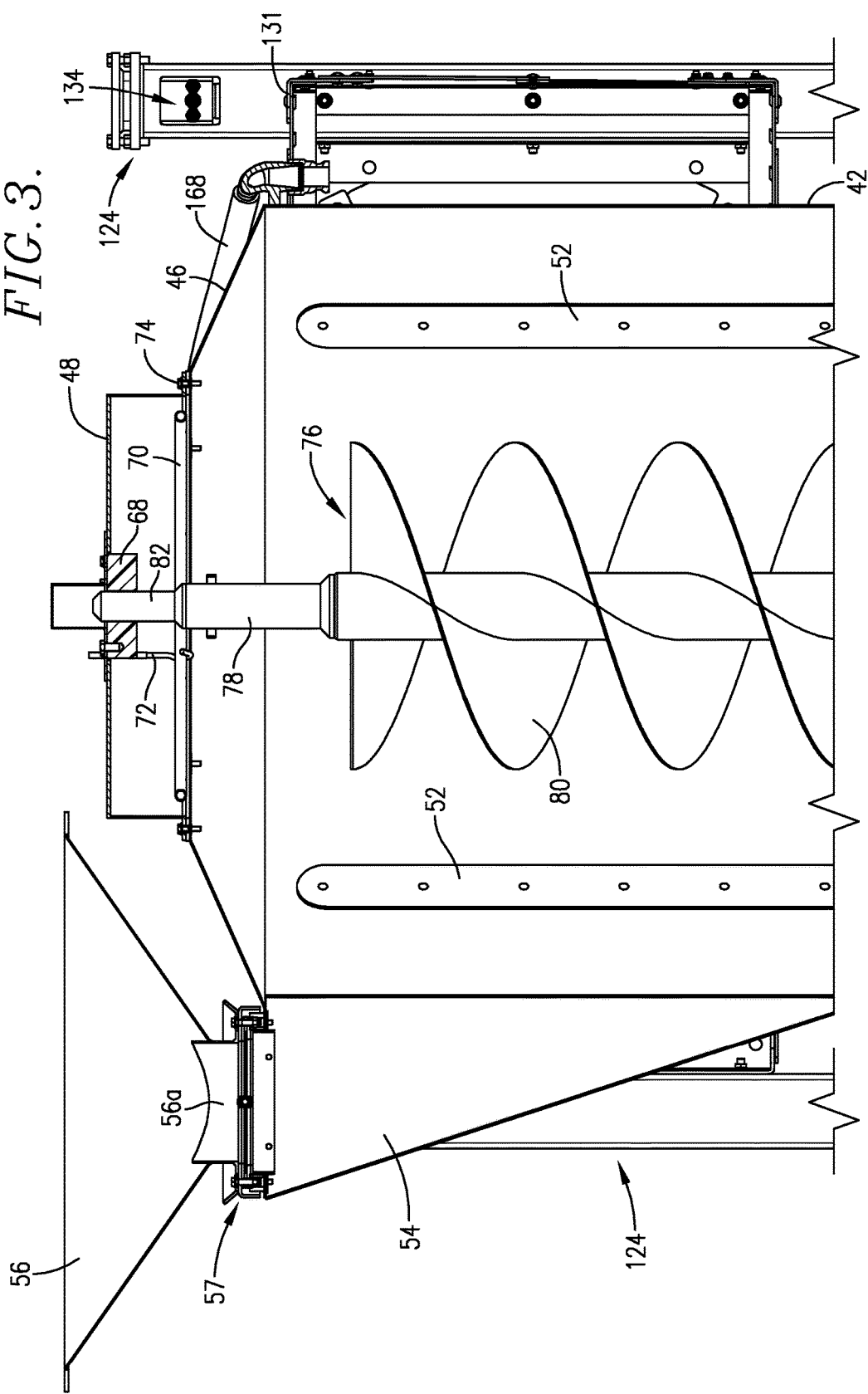
FIG. 3 is an enlarged fragmentary vertical sectional view illustrating the upper end of the coater auger and the seed inlet cone of the batch coater.

The container 24 also includes an internal auger unit 76, made up of an upright auger shaft 78 and outwardly extending auger flighting 80. The upper end of shaft 78 is equipped with a stub 82, which extends into and is supported by guide block 68 (FIG. 3). The lowermost end of shaft 78 presents a hexagonal opening 84, whereas the lowermost margin 86 of flighting 80 is sized to fit within the radial grooves 40 of disk 38.

An auger drive assembly 88 is provided for rotation of auger unit 76, and includes a drive hub 90 having a top plate 92 and an upstanding peripheral shoulder 94 which surrounds disk 38. As best seen in FIG. 2, the top plate 92 is equipped with a pressurized air inlet nipple 91. A series of depending webs 96 support the plate 92 and are in turn integral with a circular bottom plate 98. The plate 98 is fixedly secured to a mounting plate 100. A rotatable drive shaft 102 extends upwardly through the drive hub 90 and is supported by appropriate bearing structure 104. The upper end of shaft 102 has a hexagonal stub 102a and extends into hexagonal opening 84 to provide a driving connection with auger shaft 78. A drive pulley 106 is secured to the lower end of shaft 102 below plate 100 (FIG. 2). An electric drive motor 108 is supported on plate 100 and has an output shaft 110 equipped with pulley 112. A drive belt 114 is trained about the pulleys 112, 106 to effect powered rotation of drive shaft 102.

The coater support and lift assembly 26 includes an upper rectangular frame 116 made up of interconnected metallic tubular elements 118 which support mounting plate 100. A lower frame assembly 120 includes a pair of spaced apart tubular metallic channels 122. When the assembly 20 having the configuration of FIGS. 1-4 is employed, the channels 122 engage the floor.

Figure 9:
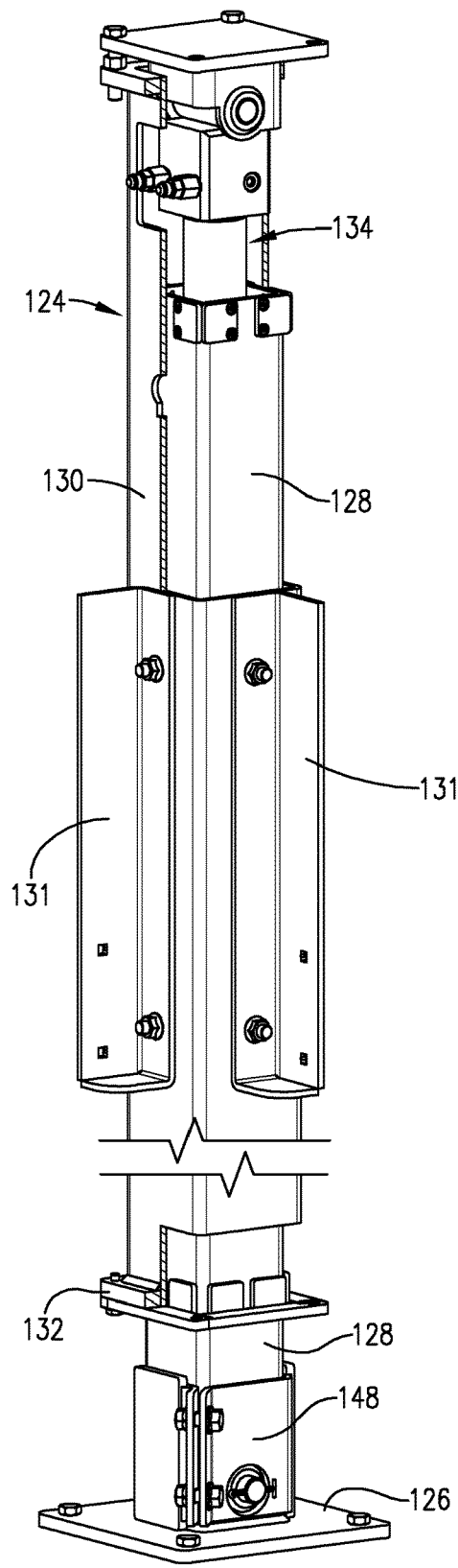
FIG. 9 is a fragmentary view of one of the lift frame corner posts forming a part of the support and lift frame assembly for the coater, with the bottom bracket used when the dust hood assembly is employed.

The overall assembly 26 also has a plurality of four identical corner posts 124. Each such post has a lowermost floor-engaging pad 126 with an interconnected upstanding central post component 128 of square hollow configuration. An outer square tubular post component 130 is telescoped over the component 128 and is vertically shiftable relative to the latter; the component 130 carries a lowermost abutment flange 132, as best seen in FIG. 9. A hydraulic piston and cylinder assembly 134 is housed within the component 128, permitting selective elevation and retraction of the component 130 during operation of coater assembly 20, as will be described. As shown, conventional cross-brace assemblies 131 extend between and are interconnected with the adjacent components 130. A somewhat trapezoidal support bracket 136 is secured to the component 130 of each post 124 and is in turn secured to the elements 118 of upper frame 116, using suitable connection structure. Accordingly, raising and lowering of the outer components 130 via the assemblies 134 effects corresponding raising and lowering of the entirety of the container 24.

The use of dust hood assembly 28 is an optional feature of the present invention. The assembly 28 includes a metallic housing 138 having an uppermost extension 140, which receives the delivery chute 60 (see FIG. 8), and a radially expanded lower section 142, which extends beneath the frames 116 and 120. A resilient peripheral skirt 144 is attached to and extends from the outer margin of lower section 142. A dust outlet tube 146 is coupled with lower section 142 and is designed for coupling with a vacuum source (not shown). When the dust hood assembly 28 is used, each of the central post components 128 is equipped with a detachable support collar 148 adjacent the lowermost end thereof and abutting pad 126 (FIG. 9).

Maintenance frame assembly 30 includes a pair of laterally spaced apart, upright struts 150 supported on a pair of lower channels 152. The upper ends of the struts 150 are designed to be detachably connected with brackets 153 provided on opposite sides of the guide 54 (FIG. 6). Oblique reinforcement elements 154 extend between the outboard ends of the channels 152 and the upper ends of struts 150. A reinforcing cross-beam 156 extends between and interconnects the two channels 152. The inboard ends of the channels 52 are equipped with arcuate mounts 158.

Figure 10:
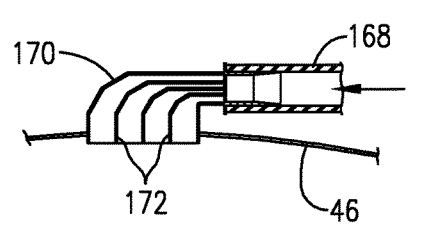
FIG. 10 is a fragmentary vertical sectional view illustrating the powder inlet for the batch coater.

Again referring to FIG. 1, a coating container 32 is typically used in conjunction with the assembly 40. In the illustrated embodiment, the container 32 includes an upright tank 160 supported by a triangular frame assembly 162. A motorized stirring mechanism 164 includes a stir bar (not shown) extending into the interior of tank 160. The tank 160 is equipped with an outlet valve arrangement 166. In the illustrated embodiment, the tank 160 is designed to hold a powder material, such as talcum, which is applied to the seeds within container 24. A transfer hose (not shown) extends from the outlet of valve arrangement 166 to a delivery hose 168 provided on lid 46. The terminal end of delivery hose 168 has a powder inlet fitting 170 leading to the interior of the container 24. Advantageously, the fitting 170 has a series of blades or fingers 172 (FIG. 10) which serve to disperse the coating powder delivered from tank 160 as the powder enters the container 24.

In alternate forms, a coating container assembly can be provided for holding liquid coating materials. In such embodiments, a conventional conveying hose extends between the outlet of the liquid holding tank to a liquid inlet fitting 174 provided on top cap 48. The fitting 174 is in turn operatively connected with the spray injection ring 70 housed within the cap 48 (FIG. 4). In this way, liquid coating material is delivered to the interior of the container 24 during operation of assembly 20. The power unit 34 is itself entirely conventional, and has a hydraulic pump 176 and drive motor 178. Suitable hydraulic lines extend from the pump 176 to the four piston and cylinder assemblies 134, whereas electrical power is provided for drive motor 108, and pressurized air is provided to the shiftable gate assemblies 57 and 62, and nipple 91.

General Operation of Batch Coater Assembly 20

The assembly 20 is specifically designed for use with conventional, commercially available seed bins 22, such as those sold by Buckhorn, Inc. Such bins are generally quadrate in cross-section, and include an upper inlet as well as a lower outlet. When a filled bin 22 is delivered to the assembly 20 for coating, the latter will be in the lowered position thereof. In the first step, the bin 22 is elevated using a lift truck until the bottom outlet opening of the bin is positioned directly above the conical seed inlet 58, as shown in FIG. 6. The bin outlet is then opened, allowing seed to gravitate from the bin 22 into the interior of container 24.

In order to coat the seeds within container 24, the auger unit 76 is actuated to rotate auger shaft 74 through the medium of drive motor 108 and related drive structure. Simultaneously, pressurized air is delivered through an air hose connected with nipple 91. Accordingly, pressurized air passes upwardly and into container 24 because of the small clearance provided between the bottom of section 36 and closure disk 38, which serves to further agitate the seed as coating proceeds. The desired coating material is delivered via the fitting 170 or 174, depending upon whether the coating material is dry, such as a powder, or is in the form of a liquid. This operation proceeds until the batch of seeds within the container 24 is properly coated, whereupon the operation of auger unit 76 is terminated along with delivery of coating material and agitation air.

After the coating operation is completed, the piston and cylinder assemblies 134 associated with the corner posts 124 are operated in order to elevate the container 24 to the unloading position depicted in FIG. 7. This provides sufficient clearance beneath the delivery chute 60 to allow the coated seeds to gravitate from the container 24 and into the bin 22. The refilled bin 22 is then removed, and the assemblies 134 are actuated to lower the container 24 back to its original position, ready to receive another batch of seed to be coated.

Use of Dust Hood Assembly 28

In some instances, considerable dust can be generated by the transfer of coated seed back into the bin 22. Such a situation is more likely when the seed is coated with dry material. The assembly 28 is designed to minimize the escape of such dust during the bin refilling operation.

When it is desired to use the assembly 28, the container 24 is lifted via the assembly 134, and a bracket 148 is secured to the lower end of each central component 128 (FIG. 9). Next, the assembly 28 is secured to the underside of container 24 so that the housing 138 is below the frame element 118 and the extension 140 is oriented in surrounding relationship to delivery chute 60. The purpose of the 148 is to prevent damage to the assembly 28 when the container 24 is in its lowermost position, as illustrated in FIG. 6. That is, the brackets 148 prevent lowering of the container 24 to a point where the underlying assembly 28 could be damaged.

Once the assembly 28 is attached below the container 24, the filling of container 24 from the bin 22, and subsequent coating of the seed within container 24, are carried out as described previously. However, when the container 24 is elevated to its seed delivery position (FIG. 7), the empty bin 22 is positioned so as to be surrounded and covered by the skirt 144. A source of vacuum (not shown) is secured to tube 146, and the seed outlet 58 is opened to allow gravitational flow of the coated seed through chute 60, assembly 28, and ultimately into the bin 22 for refilling thereof. The vacuum drawn through tube 146, and the placement of skirt 144, serves to greatly reduce or eliminate generation of dust during the course of refilling of the bin 22.

Use of the Maintenance Frame Assembly 30

The bin 24 and other operating components therein require periodic maintenance. In order to allow such maintenance, use may be made of the frame assembly 30, which allows ready access to the interior of the bin 24.

In the use of frame assembly 30, the upper ends of the struts 150 are detachably connected to the brackets 153 secured to the outer face of section 42, and the assembly 30 is rotated downwardly until the mounts 158 engage the outer surface of section 42. The clamps 44 are then detached, and the entire upper section 42 can be lifted using any suitable lift mechanism having tongues extending into the channels 152. This serves to elevate the entire section 42 and the associated structure, permitting access to the interior of the container 24 and auger unit 76. After necessary maintenance, the process is reversed and the clamps 44 are reconnected, whereupon the entire assembly 30 is detached from the container 24.

I claim:

1. A method of batch coating particulates which are provided in a particulate bin, comprising the steps of:
    elevating said particulate bin above a particulate coating container having an upper inlet and a lower outlet;
    delivering a particulate content of the particulate bin through said upper inlet and into an interior of said particulate coating container to empty the particulate bin;
    coating said particulates within the particulate coating container with a coating material introduced into the particulate coating container;
    elevating the particulate coating container after said coating step;
    placing an empty particulate bin below said particulate coating container and lower outlet; and
    delivering the coated particulates from said lower outlet into said empty particulate bin.

2. The method of claim 1, the particulate coating container having an upright, axially rotatable auger therein, and including a step of rotating said auger during said coating step.

3. The method of claim 1, including providing a seal between said lower outlet and said empty particulate bin during said delivery of coated particulates from the particulate coating container into the empty particulate bin, and withdrawing dust during such delivery.

4. The method of claim 3, including creating a vacuum to withdraw said dust.

5. The method of claim 1, including diffusing said coating material during introduction of the coating material into said particulate coating container.

6. The method of claim 1, including introducing pressurized air into said particulate coating container during said coating step.

7. The method of claim 1, using said elevated particulate bin as the empty particulate bin placed below said lower outlet.

* * * * *